(12) United States Patent
Gudlavenkatasiva et al.

(10) Patent No.: US 9,311,175 B2
(45) Date of Patent: Apr. 12, 2016

(54) METHOD AND SYSTEM FOR PROCESSING LOG INFORMATION

(75) Inventors: Bhaskar R. Gudlavenkatasiva, Tampa, FL (US); Nityanand Sharma, Tampa, FL (US); Sutap Chatterjee, Tampa, FL (US); Josy John, Wesley Chapel, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 417 days.

(21) Appl. No.: 13/114,817

(22) Filed: May 24, 2011

(65) Prior Publication Data

US 2012/0303641 A1    Nov. 29, 2012

(51) Int. Cl.
*G06F 11/07*  (2006.01)
*G06F 17/30*  (2006.01)

(52) U.S. Cl.
CPC ........ *G06F 11/0769* (2013.01); *G06F 11/0709* (2013.01); *G06F 17/30371* (2013.01)

(58) Field of Classification Search
CPC ..................... G06F 11/0709; G06F 17/30371
USPC .......................................................... 707/648
See application file for complete search history.

(56) References Cited

U.S. PATENT DOCUMENTS

| | | | |
|---|---|---|---|
| 2005/0086205 A1* | 4/2005 | Franciosa et al. | 707/3 |
| 2007/0130119 A1* | 6/2007 | Phillips | 707/3 |
| 2008/0235664 A1* | 9/2008 | Carbone et al. | 717/120 |
| 2010/0017508 A1* | 1/2010 | Donadio et al. | 709/224 |

* cited by examiner

*Primary Examiner* — Alexey Shmatov

(57) ABSTRACT

An approach for collecting log information for a plurality of services according to a common format for a connector string, each service running at least one instance of a process, parsing the log information in relation to a key map, and storing the parsed information in a database.

22 Claims, 11 Drawing Sheets

FIG. 8A

| Table Name | Rows Inserted | Rows Updated | Rows Deleted | Do Not Apply | Remarks |
|---|---|---|---|---|---|
| ntas | 77 | 71 | 114 | | |
| Tlbat_gp | 116 | 304 | 134 | | |
| tlbet_gp_ref | 2 | 4 | 9 | X | check target location |
| voice-mail-tns | 0 | 0 | 185 | X | source is outdated |
| work_site_tlbt_gp | 260 | 0 | 0 | | |

| Result | Status | Source | tlbat_gp_f | nk_unt_f | lctn_f | tlbat_gp_s |
|---|---|---|---|---|---|---|
| ADD ▶ | Reviewed | SSNS<br>NTAS | 5418 | 4794 | 254845 | 4035199959 |
| DELETE ▶ | Reviewed | SSNS<br>NTAS | 9137<br>9137 | 1521<br>1521 | 125478<br>985416 | 6309814823<br>6309814823 |
| EDIT ▶ | Reviewed | SSNS<br>NTAS | 9298<br>9298 | 63214<br>63214 | 010984<br>010984 | 2108745854<br>2108745123 |
| ADD ▶ | Reviewed | SSNS<br>NTAS | 9382 | 24875 | 784512 | 9812542589 |
| DELETE ▶ | Reviewed | SSNS<br>NTAS | 12936<br>12936 | 1121<br>1121 | 145845<br>145845 | 6309630344<br>6309645281 |

803    805    807 807 807 807 807

METHOD AND SYSTEM FOR PROCESSING LOG INFORMATION

BACKGROUND INFORMATION

Modern communication systems involve a delicate interplay of network components running multiple services and multiple processes within each service. These systems are vital to business operations, such that downtime can impose significant costs to the business. The impact of network failures (even very minor ones lasting only minutes) can be measured in thousands or even millions of dollars. A vast amount of information is logged by these systems so that, in the event of a failure, the cause of the failure can be determined and corrected. However, troubleshooting log files to determine the cause is often a complex process, involving searching through large amounts of information for the specific transactions that failed at a specific point in time. The difficulty of troubleshooting using the log files is multiplied as services move to cloud computing models such that log information is spread across multiple different log files in multiple different locations. Further, the log files can contain valuable information regarding the outcome of certain transactions that did not result in a traditional error, yet still did not successfully complete the requested transaction. However, the valuable information is often deleted without being analyzed when the log files are no longer needed.

Based on the foregoing, there is a need for an approach to determine valuable information from log files and to provide faster troubleshooting.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 8A and 8B are diagrams of a comparison result as presented by a graphical user interface (GUI), according to an exemplary embodiment;

DESCRIPTION OF THE PREFERRED EMBODIMENT

An apparatus, method, and software for processing log information across multiple services running multiple processes, such as across a system used by a telecommunications service provider, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to processing log information for a telecommunications service provider, it is contemplated that these embodiments have applicability to systems operated by different organizations and to other operations wherein log information is collected.

Figure 1A:
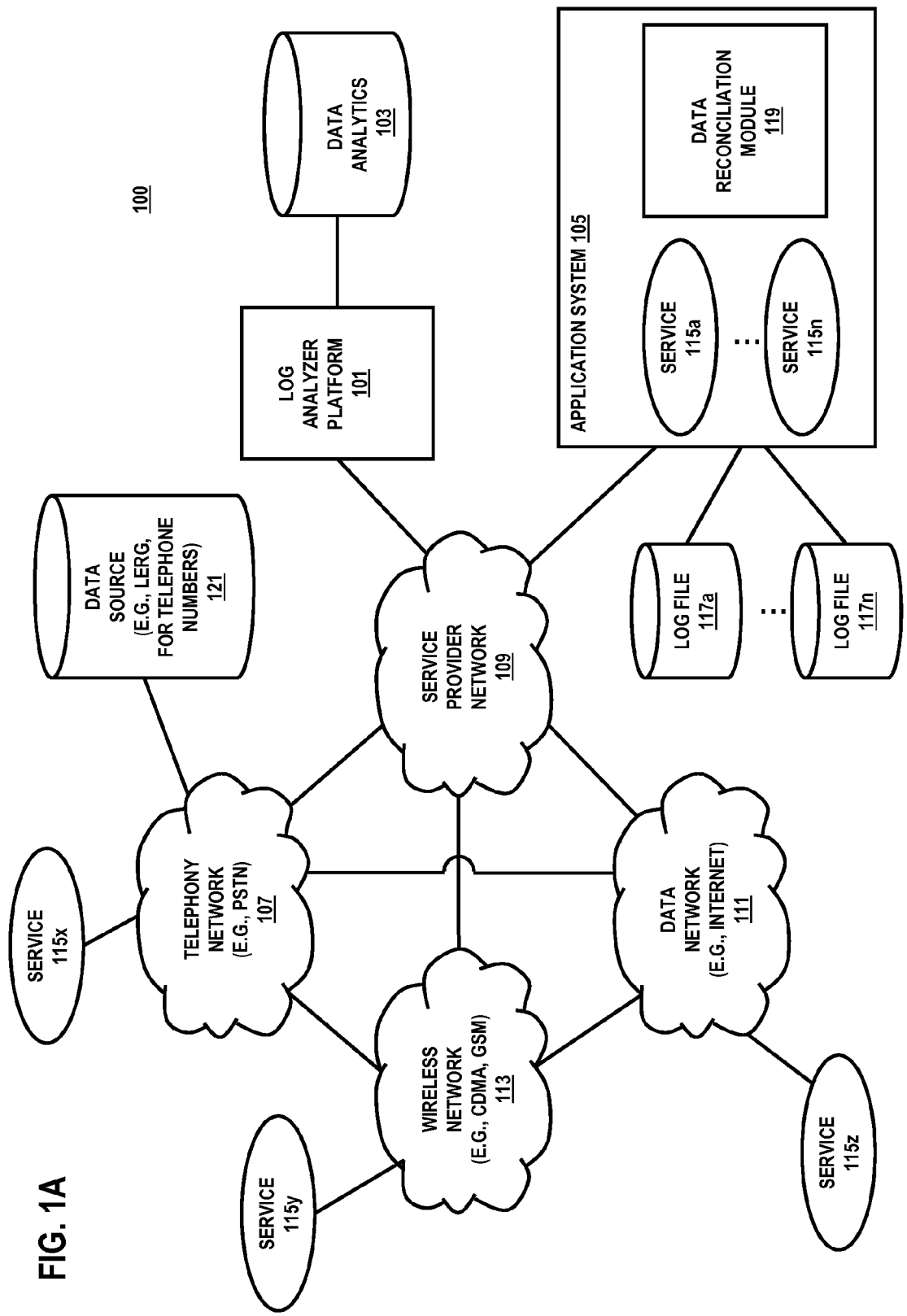
FIG. 1A is a diagram of a system capable of processing log information across multiple services running multiple processes, according to an exemplary embodiment.

FIG. 1A is a diagram of a system capable of processing log information from an application system or from across multiple services running multiple processes, according to one embodiment. As part of their operations, business concerns (e.g., service providers) may generate and capture a large amount of information over the course of even a relatively short period of time when running systems, services, and processes. The voluminous information are typically captured in form of log files. As mentioned, when errors occur in an operation of the systems, effective troubleshooting requires examination of these log files, which traditionally is a complex and arduous process involving manually initiating retrieval and search of the log files. Often, the log files can be of a substantial size (e.g., 1-5 gigabytes) and consume significant processing resources.

Further, it is recognized that certain events can occur that do not result in traditional errors, and thus, do not require troubleshooting. Nonetheless, information about these events could provide additional insight into achieving greater efficiency for the application systems and/or services. Also, errors within these systems and/or services can be prevented. By way of example, for a telecommunications service provider, a situation may occur where the service provider is attempting to provision a telephone number to a new customer. However, the application system servicing the provisioning may be unable to find a telephone number to provision (as the telephone numbers may be exhausted). Such a condition is not necessarily logged as an error or a failure in a log file; but the condition can result in continued processing until a telephone number is returned. The repeated attempts and additional processing consumes vital resources and may cause additional delays or errors.

The approach of the system 100 stems, in part, from the recognition that troubleshooting log information continues to be time consuming and that information that otherwise could lead to producing more efficient application systems and/or services is lost when log files are prematurely deleted before vital information can be extracted.

As shown, the system 100 includes a log analyzer platform 101 implemented as, for example, part of a service provider network 109 for summarizing log information associated with the service provider network 109. However, in alternative embodiments, the log analyzer platform 101 could be implemented as any part of the system 100. In one embodiment, the log analyzer platform 101 is associated with a data analytics database 103 for storing log information and log tables.

In certain embodiments, the service provider network 109 can interact with one or more other networks, such as a telephony network 107, a data network 111, and/or a wireless network 113. The service provider network 109 can include one or more application systems 105 that provide one or more services 115a-115n to the service provider network 109. The application system 105 can include one or more log files 117a-117n (collectively referred to as log files 117) that store log information regarding the services 115 running on the application system 105, the specific processes of each service, and the specific instances of each process. In one embodiment, the log files 117 can be associated with any part of the system 100, such as, the telephony network 107, the data network 111 or the wireless network 113. Additional services 115x-115z associated with, for example, the telephony network 107, the data network 111 or the wireless network 113, also can interact with the log analyzer platform 101, and the application system 105. By way of example, a service 115z associated with the data network 111 can store log information in one or more log files 117 associated with the application system 105 of the service provider network 109. The log analyzer platform 101 can then summarize the log information from the service 115z stored in the one or more log files 117.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 107-113. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

The log analyzer platform 101 establishes a format for creating a uniform connector identifier (ID) for each instance of each process of each service 115 running on, for example, the application system 105 or associated with other networks within the system 100 (e.g., services 115x-115z). Log information regarding the instances, process, and services 115 of the application system 105 are generated according to connector IDs and stored in the log files 117. Using the unique connector IDs, the log analyzer platform 101 processes the log information and stores the processed log information in the data analytics database 103 so that the processed log information can be used by additional systems or applications associated with the data analytics database 103, such as for more efficiently trouble shooting error events or analyzing the processed log information to determine certain patterns in the log information that may lead to future error events.

The application system 105 can be any suitable application system that executes applications for the service provider network 109. For example, the application system 105 may be a National Telephone Address System (NTAS) used in provisioning telephone numbers for the service provider. In one embodiment, the application system 105 includes a data reconciliation module 119 for reconciling information used by the application system 105 that is acquired by a data source 121. The reconciliation process can involve resolving format incompatibilities and/or completeness of the information. In one example, where the application system 105 is the NTAS, the data source 121 can be a Local Exchange Routing Guide (LERG) that constitutes a master or primary source for telephone numbers. In this manner, the reconciliation process would utilize data from source 121 as a baseline.

Typically, the log files 117 contain raw log information for the services 115a-115n, which run on the application system 105. In one embodiment, the log files also contain raw log information associated the services that are external to the application system 105 (e.g., services 115x-115z).

The operations of the log analyzer platform 101 involves the manipulation of these log files, as next explained.

Figure 1B:
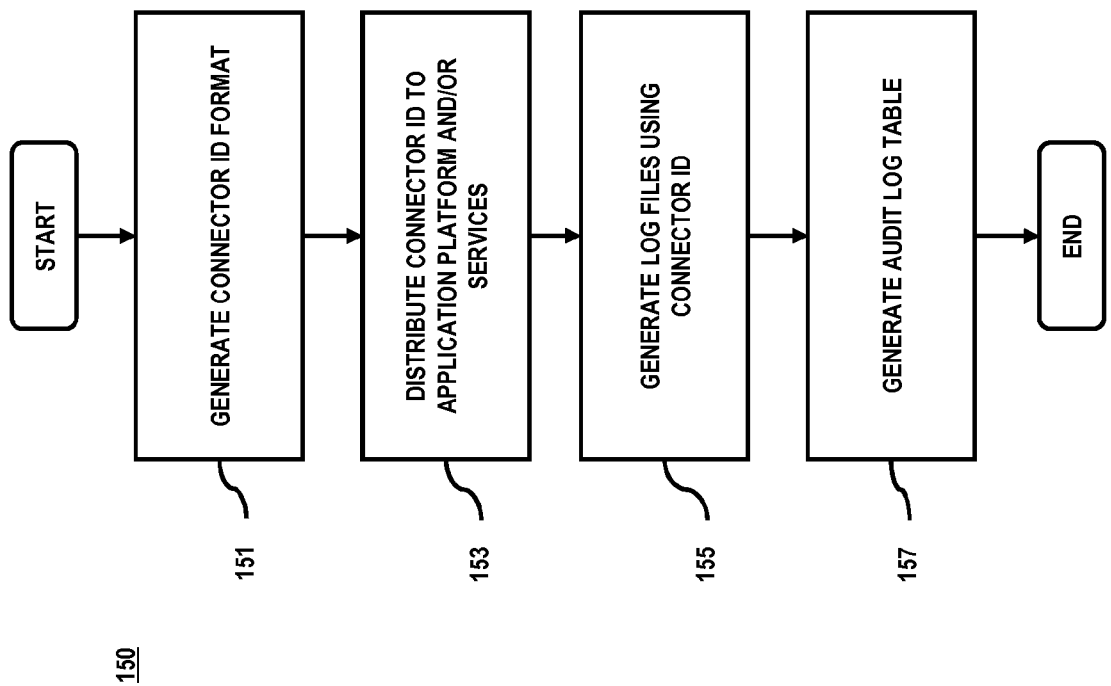
FIG. 1B is a flowchart of a process for generating, logging and analyzing log files, according to an exemplary embodiment.

FIG. 1B is a flowchart of a process for generating, logging and analyzing log files, according to an exemplary embodiment. It is noted that the steps of the process 150 may be performed in any suitable order, as well as combined or separated in any suitable manner. In step 151, the log analyzer platform 101 generates a connector ID format that is used across the services, processes as well as instances of the processes that log information in one of the log files 117 for analysis by the log analyzer platform 101. The connector ID allows the log analyzer platform 101 to distinguish log information for each service, process, and instance that is stored in the log files 117. Also, inclusion of the connector ID in the log files 117 permits, in part, tracking of the log information across multiple different log files 117; this arrangement is well suited for computing models that migrating to cloud based computing.

In step 153, the log analyzer platform 101 distributes the connector ID format to the application system 105, and/or the services 115x-115z, so that the application system 105 can uniquely identify the services 115, processes, and instances running on the application system 105, which in turn generates raw log information in the log files 117. In one embodiment, at step 153, the log analyzer platform 101 distributes the format for the connector ID to the application system 105; and the application system 105 creates the connector IDs for each service, process, and instance for the services 115 of the application system 105. By way of example, once a new instance of a process begins, the application system 105 issues a unique connector ID for the new instance of the process based on the format distributed by the log analyzer platform 101. In this manner, the specific instance of the process can be distinguished with the log files 117.

In one embodiment, at step 153 the log analyzer platform 101 distributes actual connector IDs to the application system 105 upon request from the application system 105 for uniquely indentifying a new service, process, and/or instance. By way of example, once a new instance of a process begins, the application system 105 prompts the log analyzer platform 101 for a unique connector ID for the new instance of the process so that the specific instance can be distinguished within the log files 117.

In step 155, the application system 105 generates raw log information throughout the course of executing the services 115 (along with the processes and instances of processes running during the course of business of the service provider of the service provider network 109). For instance, a service related to provisioning a telephone number executes one instance of a process for determining what telephone number to provision. Raw log information related to the execution of this process is stored across one or more log files 117. Namely, as the raw log information is generated, the raw log information is stored in one or more log files 117. By way of example, a first attempt for determining a telephone number fails to return an available number and a raw log string is logged in log file 117a regarding the failed attempt. Further, a second attempt for determining a telephone number fails to return an available number and a raw log string is logged in log file 117b regarding the failed attempt. Thus, although the results of the process are logged in different log files 117, the connector ID contained in the raw log strings tie the raw log strings to the same process across multiple different log files 117.

In step 157, the log analyzer platform 101 determines to collect the log information stored in the various log files 117 to parse the log information and map the log information according to a key map to load the information into an audit log table stored in the data analytics database 103, as discussed in detail below.

Figure 2:
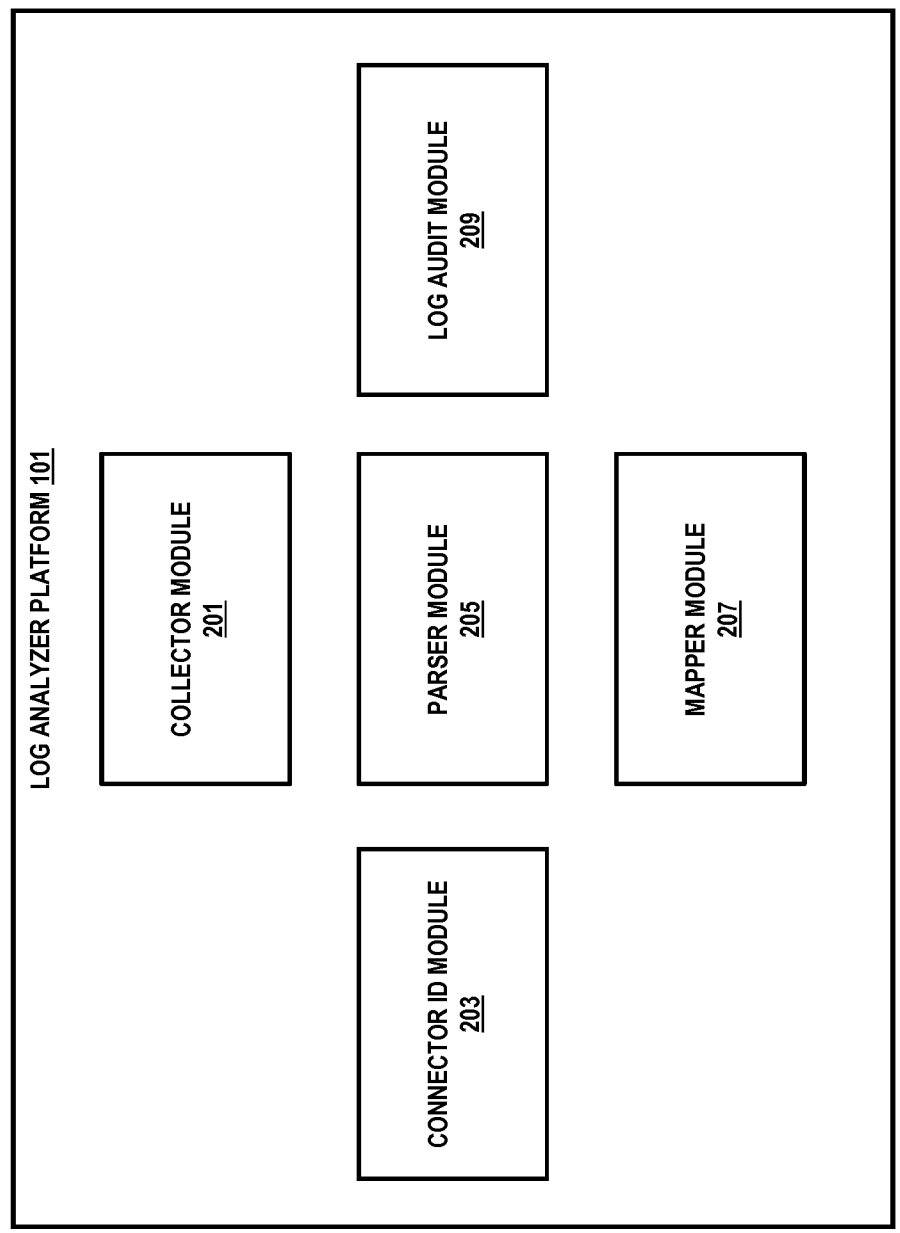
FIG. 2 is a diagram of a log analyzer platform, according to an exemplary embodiment.

FIG. 2 is a diagram of a log analyzer platform, according to an exemplary embodiment. By way of example, the log analyzer platform 101 is configured to process log information of an application system 105 of the service provider network 109. In some embodiments, the log analyzer platform 101 includes a collector module 201, a connector ID module 203, a parser module 205, a mapper module 207 and a log audit module 209.

The collector module 201 collects the raw log information from across one or more log files 117 associated with, for example, the application system 105. The collector module 201 executes one or more jobs or algorithms, such as a cron job, to load the information in the one or more log files into the raw log table 303 of the data analytics database 103. In one embodiment, the application system 105 is implemented according to a cloud model computing, with multiple instances of processes running on various different servers, with each server having its own log file 117. In one embodiment, the application system 105 can have a single, master log file 117 that contains all of the log information from across all of the servers that make up the application system 105. The collector module 201 then collects the log information from the single master log file 117 or the separate log files 117.

In one embodiment, the collector module 201 loads the raw log information from each of the one or more log files periodically using the cron job. For example, the collector module 201 may load the raw log information periodically (e.g. every N minutes), with the service provider setting the value for N for instance. Alternatively, the data can be loaded on an on-demand basis. Where the value for N is not set, the collector module 201 can utilize a default value—e.g., collect the raw log information every, for example, 60 minutes. In one embodiment, the application system 105 is configured to load the raw log information directly into the raw log table 303 within the data analytics database 103, such that the collector module 201 does not load the raw log information. In this case, the collector module 201 instead checks to ensure that the raw log information is loaded into the raw log table 303.

The connector ID module 203 establishes a format for creating a connector ID within each raw log string so that the log analyzer platform 101 can identify, for example, each instance of each process of each service across the plurality of log files 117. The connector ID can also identify, for example, the specific server within the application system 105 that executed the process. In one embodiment, the connector ID module 203 also establishes the format or template for creating the raw log strings, such as what information is stored in the multitude of raw log strings. By way of example, each raw log string contains a server name, a server instance, a timestamp, a debug mode, a message name, an application ID, the uniform connector ID and a text string concerning the information that is being logged. However, the information contained in the log strings can be any type of information, and can be different among different application systems.

In one embodiment, the connector ID establishes the format for creating the connector ID and distributes the connector IDs upon a request from the application system 105 or one or more services 115x-115z associated with other networks.

The parser module 205 parses the raw log strings stored in the raw log table 303 according to one or more algorithms, as discussed in detail below. By way of example, the parser module 205 executes an algorithm ("ParseAndLoadData-ToLogAudit") periodically to parse the raw log information contained in the raw log table 303. By way of example, the parser module 205 runs the algorithm ParseAndLoadData-ToLogAudit as a part of a batched process (e.g., every night after the raw log information has been collected during the day and when the rate of generation of new raw log information is at its slowest). Additionally, or in the alternative, the parser module 205 can parse the raw log information in real time, for example as the raw log information is loaded into the raw log table 303. By way of example, the parser module 205 has the ability to take a "snapshot" of the raw log information and parse the information for storing in the audit log table 305 of the database for future data analytics. Under this approach, data analytics can be performed on the parsed information stored in the audit log table 305 for identifying security attacks and trouble issues as they occur.

The mapper module 207 compares information within the parsed log string to one or more key terms, as discussed in detail below, as part of the analysis performed on the raw log information. By comparing the information within the parsed log string, the mapper module 207 replaces the matched portion of the parsed log string with a key term in the key map 301 to reduce the size of the audit log table 305 without reducing the amount of information stored within the audit log table 305. The log audit module 209 loads the parsed and mapped log information into the audit log table 305 of the database 3 where it can be accessed for further processing for troubleshooting errors that occurred or using data analytics to, for example, establish adaptive learning analytics.

Figure 3:
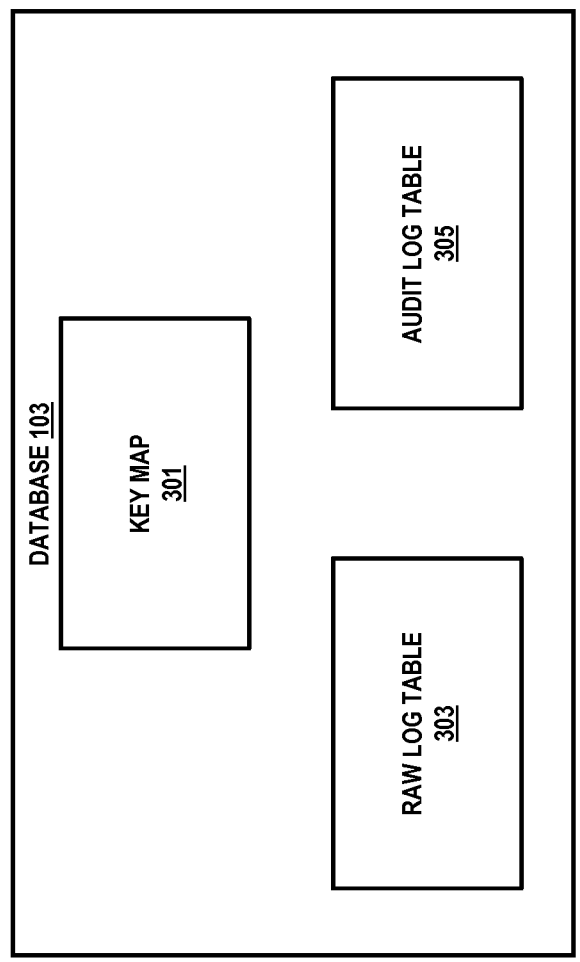
FIG. 3 is a diagram of a database used in conjunction with the log analyzer platform of FIG. 1, according to an exemplary embodiment.

FIG. 3 is a diagram of a database used in conjunction with the log analyzer platform of FIG. 1, according to an exemplary embodiment. FIG. 3 is a diagram of an embodiment of the data analytics database 103 used, for example, for storing the key map 301, the raw log table 303 and the audit log table 305 that are used by the log analyzer platform 101. As briefly discussed above, the key map 301 stores the key terms that are loaded and used by the mapper module 207. By way of example, a key map 301 can contain a key terms associated with string phrases. The raw log table 303 stores the raw log information collected from the one or more log files 117 prior to the log analyzer platform 101 parsing the log information. The audit log table 305 stores the parsed and mapped log information that can then be used by data analytic programs and applications for troubleshooting issues, capturing application performance statistics, and/or indentifying security attacks as they occur.

In some embodiments, platform 101 utilizes a database management system to maintain the data analytics database 103, wherein data can be stored in one or more data containers, each container contains records, and the data within each record is organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes.

Figure 4:
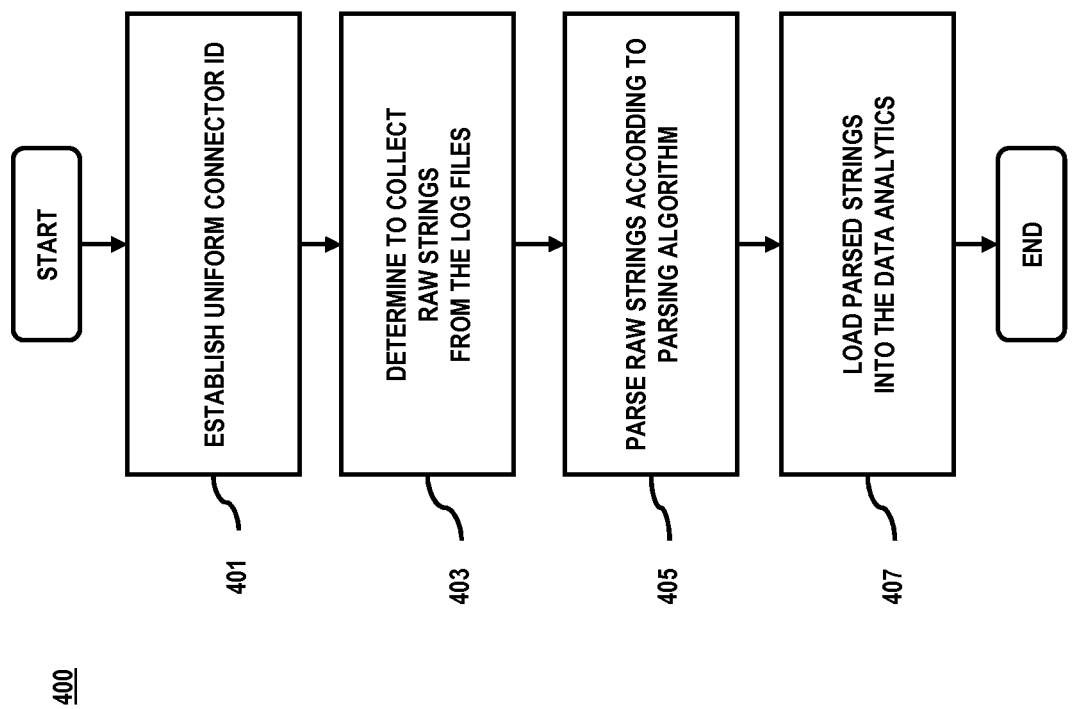
FIG. 4 is a flowchart of a log analyzing process, according to an exemplary embodiment.

FIG. 4 is a flowchart of a log analyzing process, according to an exemplary embodiment. As shown, a log information summary process 400 may be carried out by an embodiment illustrated in, for example, FIG. 2 to generate a database of parsed log information that can be used for additional data analytics. In step 401, the log analyzer platform 101 establishes a format for a connector ID for the application system 105, and/or services 115$x$-115$z$. In one embodiment, the log analyzer platform 101 distributes the format for the connector ID to the application system 105, and/or services 115$x$-115$z$, for the application system 105 to create the specific connector IDs based on the format. In one embodiment, the application system 105, and/or services 115$x$-115$z$, prompt the log analyzer platform 101 for specific connector IDs as the connector IDs are required for logging information regarding services, processes and/or instances of processes. In one embodiment, the log analyzer platform 101 also distributes the format or template for creating the raw log strings to the application system 105, and/or services 115$x$-115$z$, as discussed above.

In one embodiment, to establish the format of the connector ID, the log analyzer platform 101 determines the number (S) of different possible services that will be running on the application system 105. For each one of the different possible services, the log analyzer platform 101 determines a separator identifier. By way of example, if there are 50 possible services, the log analyzer platform 101 determines one acceptable identifier format is S00 through S49. Next, the log analyzer 101 determines the number (P) of different possible processes that will be running on the application system 105. For each one of the different possible processes, the log analyzer platform 101 determines a separate identifier. By way of example, if there are 100 different possible processes, the log analyzer platform 101 determines one acceptable identifier format is P00 through P99. Next, the log analyzer 101 determines the number (I) of different possible instances of each process that will be running on the application system 105. For each one of the different possible instances, the log analyzer platform 101 determines a separate identifier. By way of example, if there are 10 different possible instances, the log analyzer platform 101 determines one acceptable identifier format is I0 through I9. Then, in one embodiment, the log analyzer platform 101 distributes the format of the connector ID to the application system 105 for generating the log information stored in the log files 117. Alternatively, in one embodiment, the log analyzer platform 101 creates the connector IDs for the application system 105 as requested. Under this approach, the connector ID allows the log analyzer platform 101 to track a specific instance of a specific process of a specific service no matter what log file 117 includes the information.

In step 403, the log analyzer platform 101 determines to collect the raw log information from the plurality of log files 117 used by the application system 105. By way of example, the log analyzer platform 101 communicates with the application system 105 and requests access to or receipt of the log files 117. Once the log analyzer platform 101 receives the log information from the log files 117, the log analyzer platform 101 stores the log information in the raw log table 303 of the data analytics database 103. In one embodiment, the application system 105, and/or services 115, logs the raw log information directly into the raw log table 303 of the data analytics database 103. Thus, in this embodiment, the collector module 201 does not collect the raw log information. Rather, the log analyzer platform 101 ensures that the raw log information is stored in the raw log table 303 of the data analytics database 103. By way of example, the log analyzer platform 101 searches the raw log table 303 to determine whether raw log strings are present that contain, for example, each possible server name, server instance, application ID and/or connector ID. If the log analyzer platform 101 determines that not all of the raw log information is present, the log analyzer platform 101 can actively request the missing raw log information from application system 105 and/or the particular server from the application system 105.

As discussed above, the log analyzer platform 101 can periodically collect the raw log information according to a cron job. For example, the log analyzer platform 101 can run a process ("LoadRawDataToDBCron job") every N periods of time, such as every 60 or 120 minutes or every day (e.g., 2:00 AM every morning). The log analyzer platform 101 can also continuously monitor the various logs files such that there is substantially no delay between writing raw log information into the log files 117 and collecting raw log information in the log files 117 by the log analyzer platform 101.

In step 405, the log analyzer platform 101 parses the information stored in the raw log table 303 and compares the parsed data to the key map 301 stored in the data analytics database 103. By way of example, the raw log information is read from the raw log table 303 of the data analytics database 103 and parsed using a "ParseLawLogData" algorithm, as discussed in detail below. The log analyzer platform 101 can parse the raw log information according to a similar schedule as discussed above regarding collecting the raw log information. For example, the log analyzer platform 101 can run a ParseLawLogData algorithm every N periods of time, such as every 60 or 120 minutes. The log analyzer platform 101 can also run the ParseLawLogData algorithm at a off-peak period (e.g., at night) when, for example, the load on the application system 105 is decreased as compared to during the day such that the amount of log information being generated is temporarily reduced. The log analyzer platform 101 can also run the ParseLawLogData algorithm continuously such that, when new raw log information is written into the raw log table 303, the log analyzer platform 101 parses and maps the raw log information substantially at the same time.

In step 407 the log analyzer platform 101 loads the parsed and mapped log information into the audit log table 305 of the data analytics database 103. If the log analyzer platform 101 is processing the raw log information according to a batch processing, such as every N minutes, after loading the parsed log information into the audit log table 305 of the data analytics database 103, the log analyzer platform 101 clears the raw log table 303. Similarly, if the log analyzer platform 101 is processing the raw log information substantially continuously, when a parsed and mapped log string is entered into the audit log table 305, the log analyzer platform 101 clears the corresponding raw log string from the raw log table 303 to make room for new raw log strings.

Figure 5:
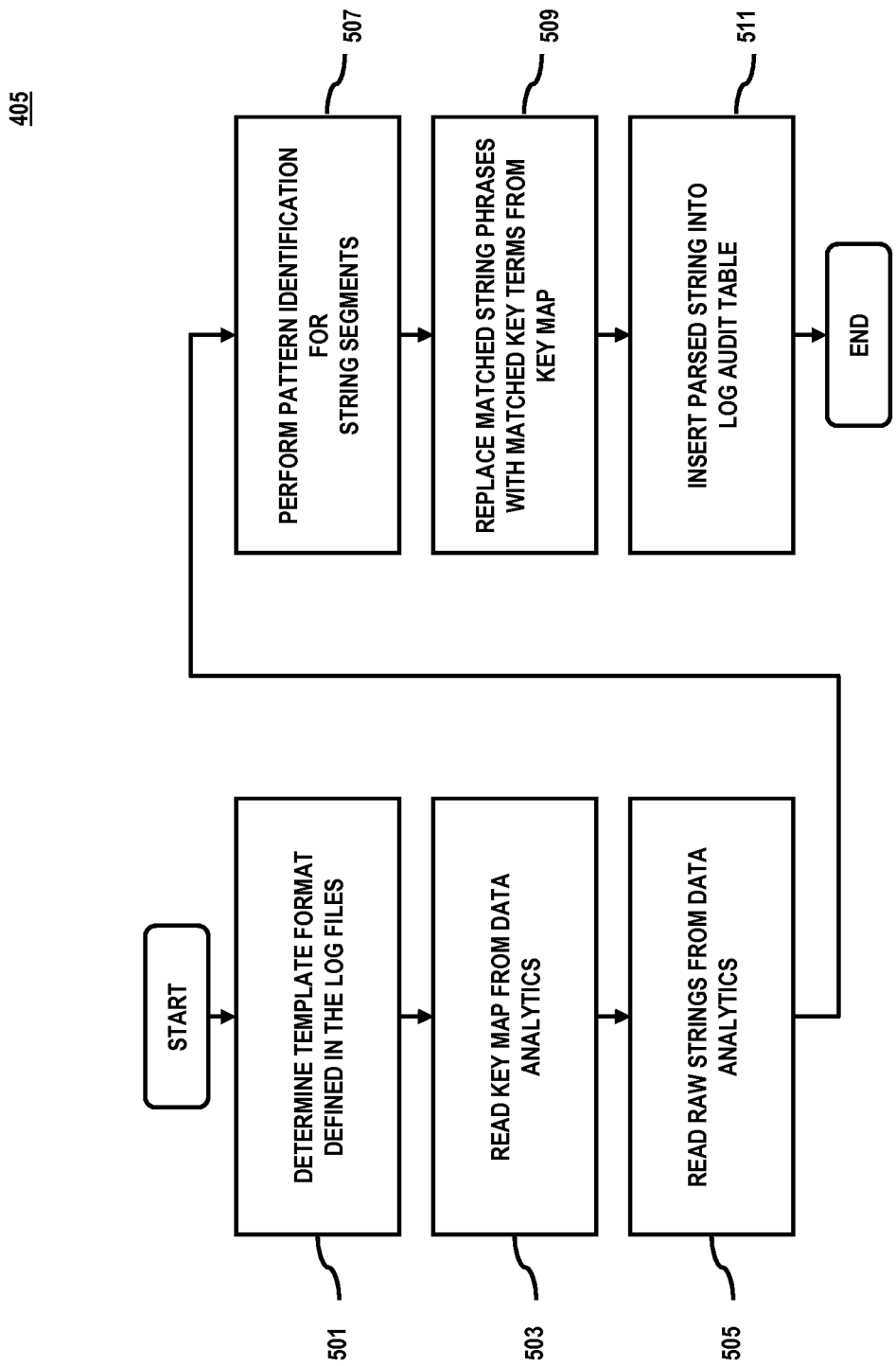
FIG. 5 is a flowchart of a process for parsing the raw log strings collected across multiple log files of an application system, according to an exemplary embodiment.

FIG. 5 is a flowchart of a process for parsing the raw log strings collected across multiple log files of an application system, according to an exemplary embodiment. Process 500 provides further details of step 405 of the process 400. In step 501, the log analyzer platform 101 loads the format or template previously created by the log analyzer platform 101 and used by the application system 105 for formatting the raw log strings in the log files 117. Although a specific format is not required, the log analyzer platform 101 loads the format for processing the log information to determine the different segments of the raw log strings contained in the raw log information.

In step 503, the log analyzer platform 101 reads the information from the key map 301 regarding the key terms. By way of example, the key map 301 contains a key term and a string phrase that are associated with each other to replace the string phrase contained in a text string of a raw log string with the key term. In this approach, the log analyzer platform 101 can reduce the size of the information that is saved without reducing the amount of information that is saved. For example, the key term of 'TNAGING' is associated with the string phrase of 'TN is in AGING status,' such that, when the text string of a raw log string contains 'TN is in AGING status,' the phrase is replaced with 'TNAGING.'

In step 505, the log analyzer platform 101 reads the raw log information from the raw log table 303 of the data analytics database 103. The log analyzer platform 101 loads the raw log information into memory (e.g., RAM) to process the raw log information according to the one or more algorithms. Then, in step 507, for each raw log string in the raw log information, the log analyzer platform 101 uses one or more algorithms, in combination with the known format of the raw log strings, to perform a pattern match to determine, for example, the specific information within each raw log string. By way of example, the log analyzer platform 101 analyzes each raw log string to determine the server name, server instance, timestamp, debug mode, message name, application ID, connector ID and text string associated with the raw log string. After determining the specific segments of each raw log string, the log analyzer platform 101 parses the specific segments from the raw log string and loads the segments into a table, while still associating each segment from a specific raw log string together, as addressed below in relation to FIG. 6.

In step 509, the log analyzer platform 101 compares the loaded key terms from the key map 301 to the segments of the parsed log information to determine whether any of the segments match. If any segment matches any key term, the log analyzer platform 101 replaces the matched segment of the parsed log information with the key term. By way of example, one parsed log string includes the phrase "TN can be assigned for voice selection" as the text string. A key term "TNVOICESLN" from the key map 301 matches the above phrase. Thus, the log analyzer platform 101 replaces the phrase "TN can be assigned for voice selection" with "TNVOICESLN" as the text string for the specific parsed log string. By replacing the text string with the key term, the log analyzer platform 101 reduces the amount of data that is stored without losing the amount information that is stored, in view of the key map 301. In step 511, the log analyzer platform 101 inserts the parsed log string into the audit log table 305 in the data analytics database 103. Thus, by way of the process step 405 executed in the process 400, the log analyzer platform 101 collects raw log information stored in one or more log files 117 across an application system 105 and processes the information to create a data table within the data analytics that can be used by additional application systems or processes for troubleshooting errors or analyzing the data to create a better, more efficient application system 105.

Figure 6:
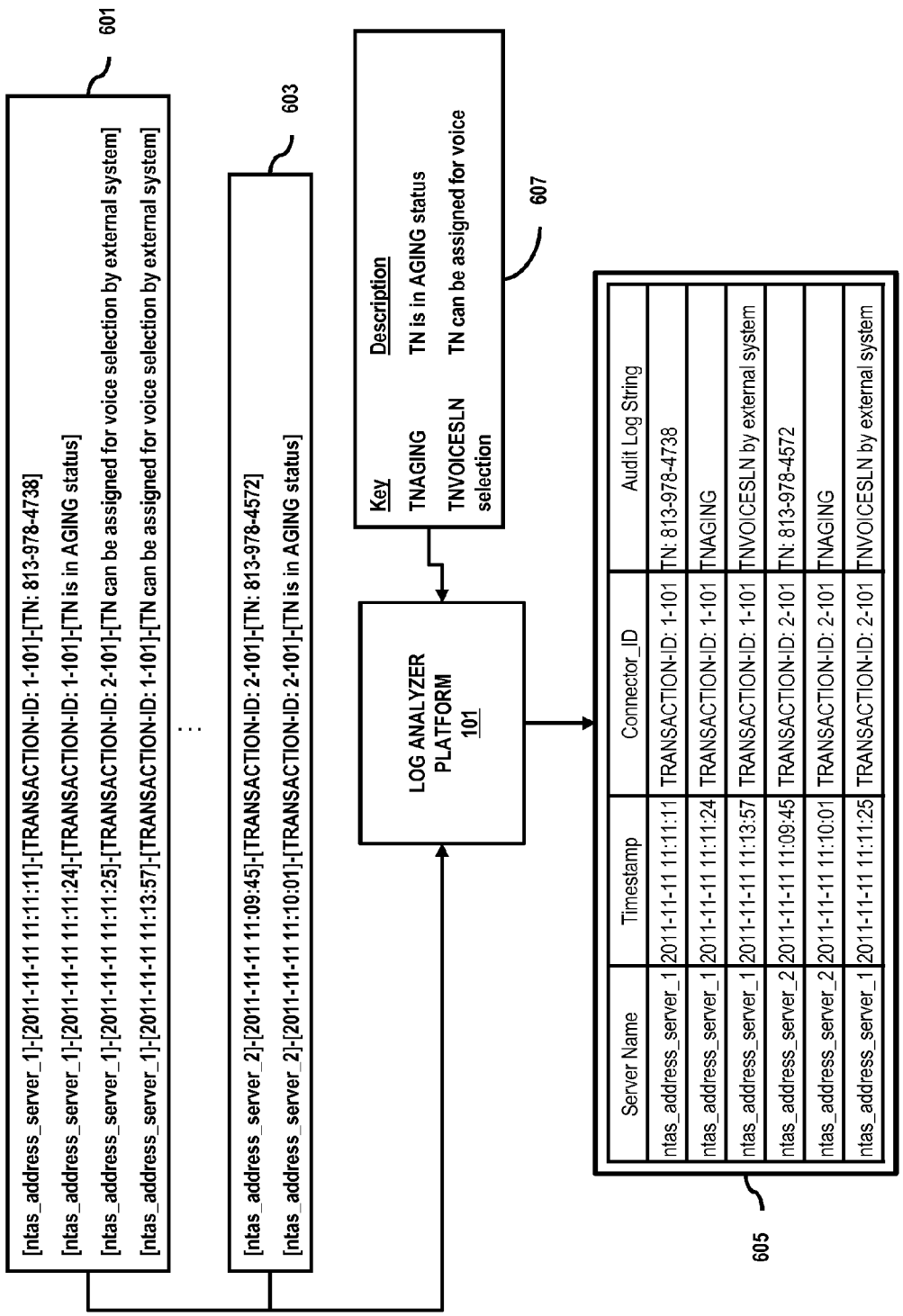
FIG. 6 is a diagram of exemplary raw log strings processed by a log analyzer platform, according to an exemplary embodiment.

FIG. 6 is a diagram of exemplary raw log strings processed by a log analyzer platform, according to an exemplary embodiment. Specifically, FIG. 6 depicts raw log strings before and after being processed by the log analyzer platform 101, wherein an audit log table 305 is produced for storage within the data analytics database 103, according to an exemplary embodiment. As shown, log files 601 and 603 are of various sizes. By way of example, the log file 601 is from one server within the application system 105; and the log file 603 is from another server running as part of the application system 105. Log files 601 and 603 include four and three raw log strings, respectively. Each of the raw log strings include a server name (e.g., ntas_address_server_1), a timestamp (e.g., 2011-11-11 11:11:11), a connector ID (e.g., TRANSACTION-ID: 1-101) and a text string that describes what is being logged (e.g., TN is in AGING status). As shown, a key map 607 includes various key terms (e.g., TNAGING, TNVOICESLN) and the corresponding text strings that are associated with the key terms (e.g., TN is in AGING status, TN can be assigned for voice selection).

The log analyzer platform 101 parses and compares the log files 601 and 603 with the key map 607 and forms the specific audit log table 605 that is stored in the database, as discussed in detail above. As exemplified in FIG. 6, the audit log table 605 is in the format of a database table rather than a log file, with the similar raw log string segments parsed and formatted according to columns of the type of the segment. The audit log strings are also shortened according to the key map 607 to reduce the size of the audit log table 605.

Using the framework described above regarding the log analyzer platform 101 in conjunction with an application system 105, a service provider can create real-time reports of count messages received per application ID. Thresholds can be defined for each application and the corresponding number of possible message requests such that, if the number of count messages received exceeds a configured threshold value, the application can be blocked from querying any further data until the issue is resolved. This framework could detect and prevent any kind of malicious attacks. Such a framework could also generate day-to-day traffic reports categorized by message name, server and application or form an adaptive learning framework that tracks a number of requests and their corresponding responses, which in turn could be used to generate alert conditions based on the historical trend.

This framework could also monitor specific error codes or log messages to alert production support/database administrators (DBAs) or business owners if a specific error or log message exceeds a certain threshold thereby eliminating the need for other monitoring scripts/tools. The use of the uniform connector ID also allows debugging of workflow related issues or interactions between multiple servers. For example, a search for the uniform connector ID for a particular day will list out all of the log messages related to the connector ID, ordered by time. The search can further be refined by server name, instance and/or timestamp, etc.

Figure 7:
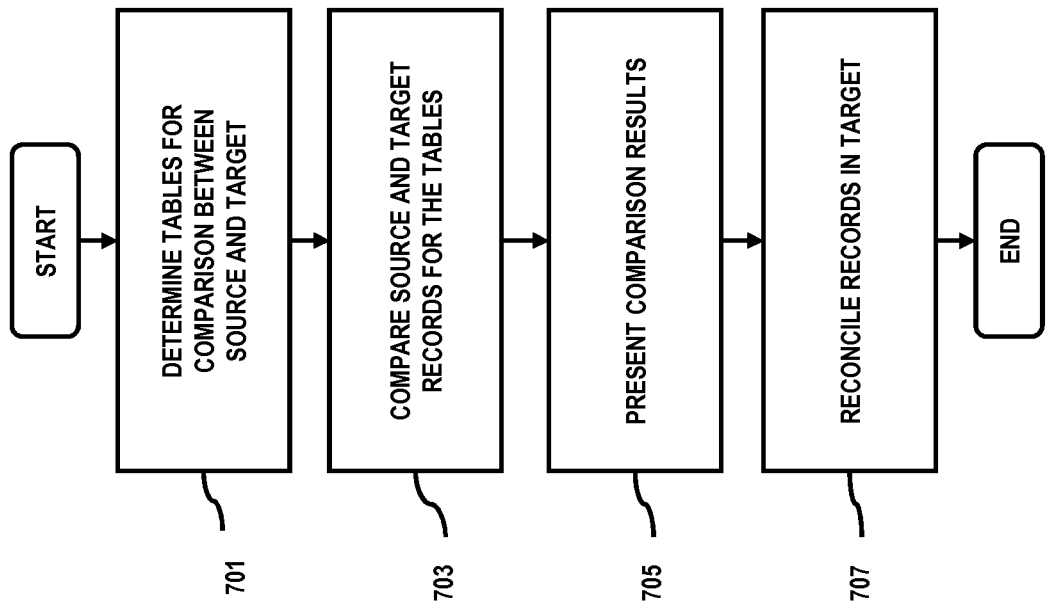
FIG. 7 is a flowchart of process for comparing and reconciling records, according to an exemplary embodiment.

FIG. 7 is a flowchart of process for comparing and reconciling records, according to an exemplary embodiment. In one embodiment, the comparison and reconciliation process 700 is performed by the data reconciliation module 119 of the application system 105. By way of example, the application system 105 may be a NTAS application system 105, as discussed above, that compares information previously saved from a source system such as, for example, the data source 121 with current information. In such an embodiment, the data source 121 acts as a source of information that may change independently from the information contained in the application system 105. In such a scenario, the determination of what information has changed and the reconciliation of the changed information leads to more efficient processes. The process 700 presents a framework or design pattern to compare data between a source and a target and present the differences in a manner that allows for visualization and reconciliation of the differences.

In step 701 of the process 700, the data reconciliation module 119 determines the tables or files that are compared between a source system and a target system. By way of example, the data reconciliation module 119 determines the table or files that are compared between the data source 121 (e.g., LERG) and the application system 105 (e.g., NTAS) to determine the differences in the application system 105 controlled by the service provider network 109 and the data source 121, which can be third-party controlled. For each table or file, the data reconciliation module 119 identifies the records for the source and target systems for comparison. For example, the tables within the source and target systems comprise record elements ordered according to record fields that are compared to determine the respective differences.

In step 703, the data reconciliation module 119 determines whether a source and target record element from a specific table and record field match. If the record elements match, and the record fields for the record elements match, the next record element is compared (e.g., there is no difference that needs reconciliation). If the record elements match, but the record fields for the record elements do not match, the record elements are identified as being mismatched and the record fields are highlighted to be updated. If the record elements do not match and the record element from the source is missing in the target, the record element from the source is inserted into the target and a note is generated. If the record elements do not match and the record element from the target is missing in the source, the record element in the target is deleted and a note is generated. The same process is performed for each record element associated with each record field for the table that is being compared between the source system and the target system.

In step 705, the comparison results are presented to, for example, the service provider operating the application system 105 through a graphical user interface (GUI) using a network based framework. The results can be a broad overview of the comparison showing multiple tables that are compared at once, or the results can be a specific overview of the comparison showing the results of one specific table at a time. When the results are compared, all of the changes can be accepted or rejected based on whether the comparison results are marked, for example, "Reviewed" and/or "Do not Apply Changes." Alternatively, the comparison results can be individually modified on a record-by-record basis. Based on the input through the GUI, the target is updated according to the changes to reconcile the target system according to the records of the source system (step 707).

FIGS. 8A and 8B are diagrams of a comparison result as presented by a graphical user interface (GUI), according to an exemplary embodiment. In particular, FIG. 8A illustrates a summarized view 801 of the differences between a source system and a target system at the table/file level, according to one embodiment. As illustrated in the summarized view 801, five different tables were compared between a source system and a target system. For each table that was compared, the summarized view 801 lists the number of rows (e.g., records) that were inserted, updated, and deleted. The rows inserted refer to instances where record elements match from the source and target tables, however the respective fields do not match; for example, the record element in the target table is in the incorrect record field. Thus, the record element is updated to be in the correct record field, which does not necessarily correspond to adding or deleting the record element. Also for each table, a checked box indicates whether the differences will be reconciled during the reconciliation step. For example, in the summarized view 801, the "Do Not Apply" box is checked for the tlbet_gp_ref table. Accordingly, the differences for this table will not be reconciled. For rows that do not include a checked box, the differences for the tables will be reconciled. The summarized view 801 can also include remarks associated with the various tables.

FIG. 8B illustrates a detailed view 803 of the differences between one table of source and target systems, according to one embodiment. The detailed view 803 includes the various record fields 805 in the first row and the record elements 807 in the below rows for each record element that was compared between a source table and a target table in each row. The detailed view 803 also includes a Status column that indicates whether the specific rows of record elements have been reviewed. The detailed view 803 also includes a Result column that indicates the action that will be carried out during the reconciliation step. In one embodiment, the Result column simply includes "Apply" or "Do Not Apply," as discussed above with respect to the summarized view 801. Rows that have "Apply" in the result column will be reconciled according to the presented differences and rows that have "Do Not Apply" will not be reconciled according to the presented differences. In one embodiment, the Result column includes specific actions that will occur during the reconciliation process, such as "Add," "Delete" or "Edit." In other words, for each record element (e.g., row), the change determined in the comparison can either be entered (e.g., "Add"), not be entered (e.g., "Delete"), and edited (e.g., "Edit"). Thus, the reconciliation of each record element can be more precisely controlled.

The processes described herein for processing log files may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
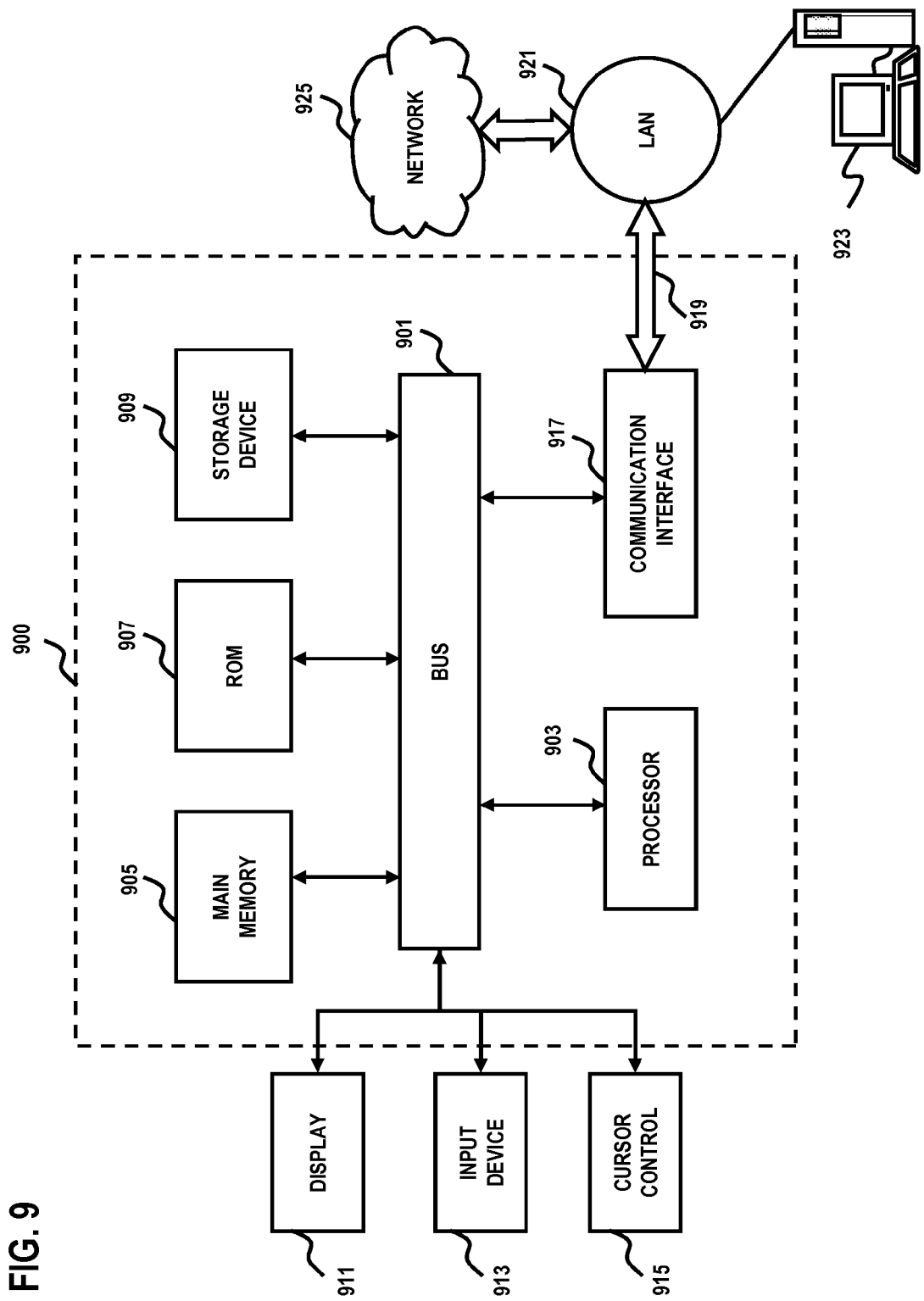
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
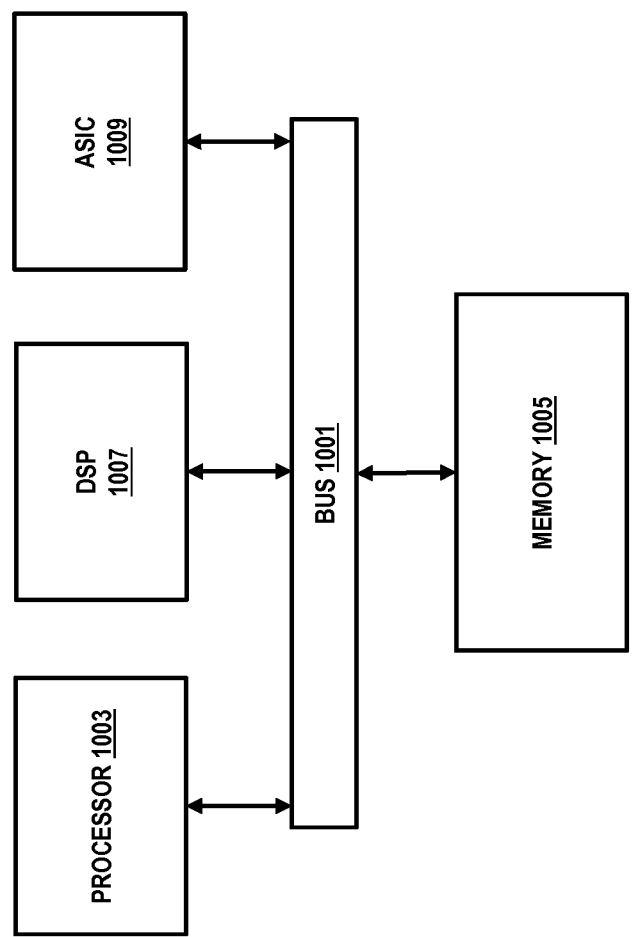
FIG. 10 is a diagram of a chip set that can be used to implement various exemplary embodiments.

FIG. 10 illustrates a chip set 1000 upon which an embodiment of the invention may be implemented. Chip set 1000 is programmed to present a slideshow as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 1B, 4, 5, and 7.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining a number of possible services, wherein the number of possible services is a plurality;
   generating a connector identifier format based on the determined possible services;
   creating one or more connector identifiers based on the generated connector identifier format and identifying at least one instance of at least one process of at least one determined service of the plurality;
   distributing at least one of the generated connector identifier format and the one or more created connector identifiers;
   collecting log information for the at least one service of the plurality according to the one or more created connector identifiers in the log information;
   parsing the collected log information in relation to a key map,
      wherein the parsing includes identifying segments and types of segments in the collected log information;
   mapping the parsed log information in relation to the key map and the one or more created connector identifiers; and
   processing the parsed log information by replacing one or more of the segments with one or more key terms from the key map.

2. A method of claim 1, further comprising:
   designating a unique created connector identifier to each instance of each process of each of the plurality of services based on the generated connector identifier format; and
   distributing the unique created connector identifiers to the plurality of services, wherein the plurality of services generates the log information based on the distributing.

3. A method of claim 1, further comprising:
   storing the processed parsed log information in a database,
      wherein the distributing is associated with a generating of log information, the generated log information associated with the connector identifier format and the one or more connector identifiers.

4. A method of claim 3, wherein a storage size of the stored processed parsed log information in the database is less than a storage size associated with a corresponding collected log information.

5. A method of claim 4, wherein an amount of information associated with the stored processed parsed log information in the database is equivalent to an amount of information associated with the corresponding collected log information.

6. A method of claim 1, further comprising:
   accessing one or more log files to collect the log information; and
   storing the accessed log information in a database.

7. An apparatus comprising:
   a processor coupled to a memory and configured to:
      determine a number of possible services, wherein the number of possible services is a plurality,
      generate a connector identifier format based on the determined possible services,
      create one or more connector identifiers based on the generated connector identifier format and identifying at least one instance of at least one process of at least one determined service of the plurality,
      distribute at least one of the generated connector identifier format and the one or more created connector identifiers,
      collect log information for the at least one service of the plurality according to the one or more created connector identifiers in the log information,
      parse the collected log information in relation to a key map,
         wherein the parsing includes identifying segments and types of segments in the collected log information,
      map the parsed log information in relation to the key map and the one or more created connector identifiers, and
      process the parsed log information by replacing one or more of the segments with one or more key terms from the key map.

8. An apparatus of claim 7, wherein the processor is further configured to:
  determine a number of possible processes of a plurality of processes associated with the plurality of services and a number of possible instances of a plurality of instances associated with the plurality of services, wherein the generation of the connector identifier format is further based on the number of possible processes and the number of possible instances.

9. An apparatus of claim 7, wherein the processor is further configured to:
  store the processed parsed log information in a database,
  wherein the distribution is associated with a generation of log information, the generated log information associated with the connector identifier format and the one or more connector identifiers.

10. An apparatus claim 9, wherein a storage size of the stored processed parsed log information in the database is less than a storage size associated with a corresponding collected log information.

11. An apparatus of claim 10, wherein an amount of information associated with the stored processed parsed log information in the database is equivalent to an amount of information associated with the corresponding collected log information.

12. An apparatus of claim 7, wherein the processor is further configured to:
  access one or more log files to collect the log information; and
  store the accessed log information in a database.

13. A method comprising:
  receiving at least one of a connector identifier format and one or more connector identifiers based on the connector identifier format, wherein the connector identifier format is based on a plurality of services, wherein the one or more connector identifiers identify at least one instance of at least one process of at least one service of the plurality of services;
  if the one or more connector identifiers are not received, determining the one or more connector identifiers based on the received connector identifier format;
  generating log files for the plurality of services including the one or more received or determined connector identifiers; and
  transmitting the generated log files, wherein the transmitted log files are configured for mapping utilizing a key map and the one or more received or determined connector identifiers, for parsing, wherein the parsing includes identifying segments and types of segments in the collected log information, and for processing the parsed log information by replacing one or more of the segments with one or more key terms from the key map.

14. A method of claim 13, further comprising:
  designating a unique received or determined connector identifier to each instance of each process of each of the plurality of services based on the received connector identifier format; and
  distributing the unique received or determined connector identifiers to the plurality of services, wherein the plurality of services generates the log files based on the distributing.

15. A method of claim 13, further comprising:
  determining a log file format for the log files,
  wherein the log file format includes the received or determined connector identifier format.

16. A method of claim 13,
  wherein the transmitting of the log files occurs periodically or substantially continuously.

17. A method of claim 13, further comprising:
  collecting the log files into a single log file; and
  permitting access to the single log file for generation of an audit log.

18. An apparatus comprising:
  a processor coupled to a memory and configured to:
    receive at least one of a connector identifier format and one or more connector identifiers based on the connector identifier format, wherein the connector identifier format is based on a plurality of services, wherein the one or more connector identifiers identify at least one instance of at least one process of at least one service of the plurality of services;
    if the one or more connector identifiers are not received, determine the one or more connector identifiers based on the received connector identifier format;
    generate log files for the plurality of services including the one or more received or determined connector identifiers; and
    transmit the generated log files, wherein the transmitted log files are configured for mapping utilizing a key map and the one or more received or determined connector identifiers, for parsing, wherein the parsing includes identifying segments and types of segments in the collected log information, and for processing the parsed log information by replacing one or more of the segments with one or more key terms from the key map.

19. An apparatus of claim 18, wherein the apparatus is further configured to:
  distribute the at least one of the received connector identifier format and the one or more received or determined connector identifiers to the plurality of services.

20. An apparatus of claim 18, wherein the processor is further configured to:
  determine a log file format for the log files,
  wherein the log file format includes the received or determined connector identifier format.

21. An apparatus of claim 18,
  wherein the transmitting of the log files occurs periodically or substantially continuously.

22. An apparatus of claim 18, wherein the processor is further configured to:
  collect the log files into a single log file; and
  permit access to the single log file for generation of an audit log.

* * * * *